April 7, 1942. W. H. PAYNE 2,278,480
MEANS FOR AUTOMATICALLY CONTROLLING THE ELECTRODES OF ARC FURNACES
Filed Dec. 27, 1940 2 Sheets-Sheet 1
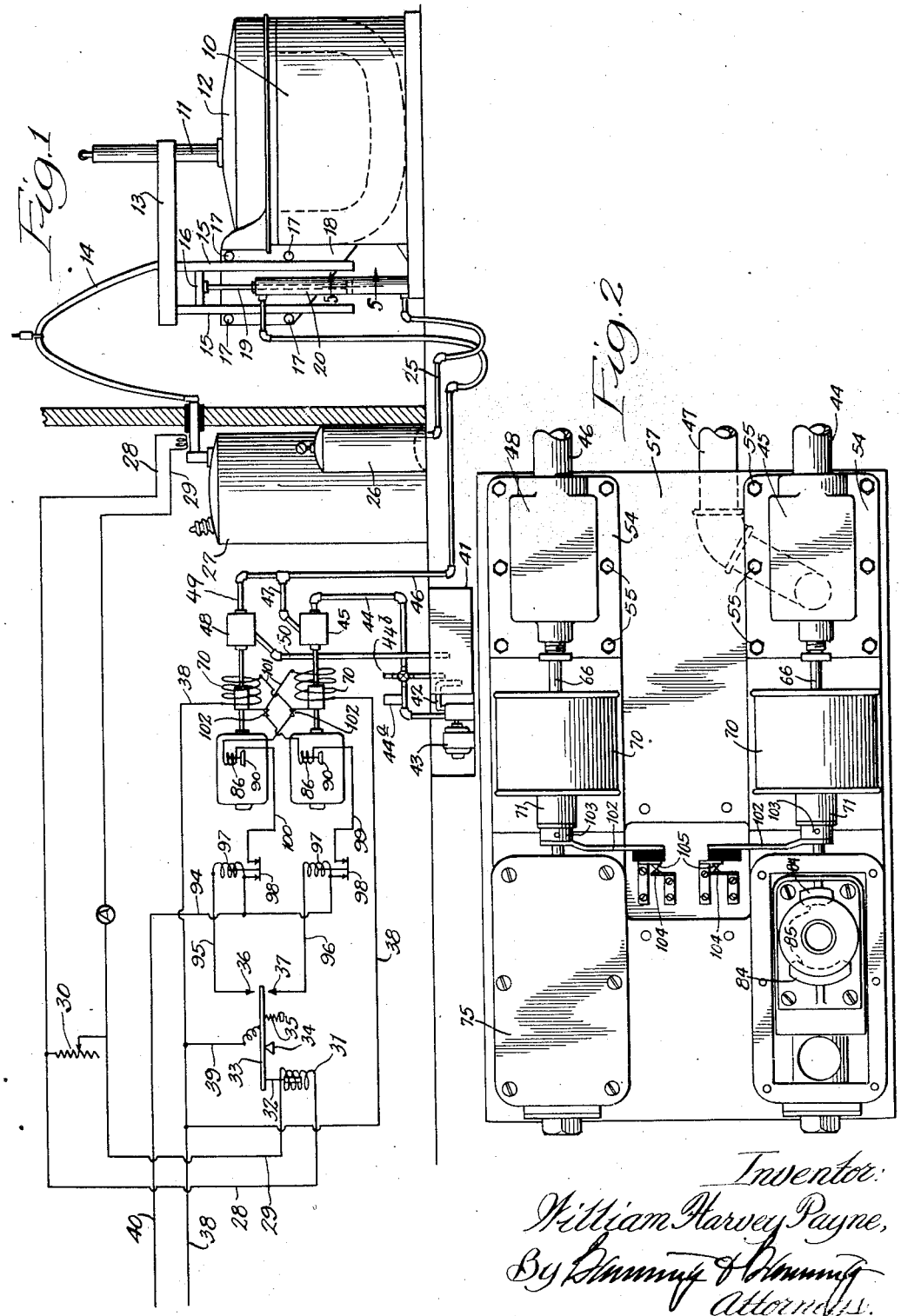
Inventor:
William Harvey Payne,
By Kenney & Kenney
Attorneys.

April 7, 1942. W. H. PAYNE 2,278,480
MEANS FOR AUTOMATICALLY CONTROLLING THE ELECTRODES OF ARC FURNACES
Filed Dec. 27, 1940 2 Sheets-Sheet 2
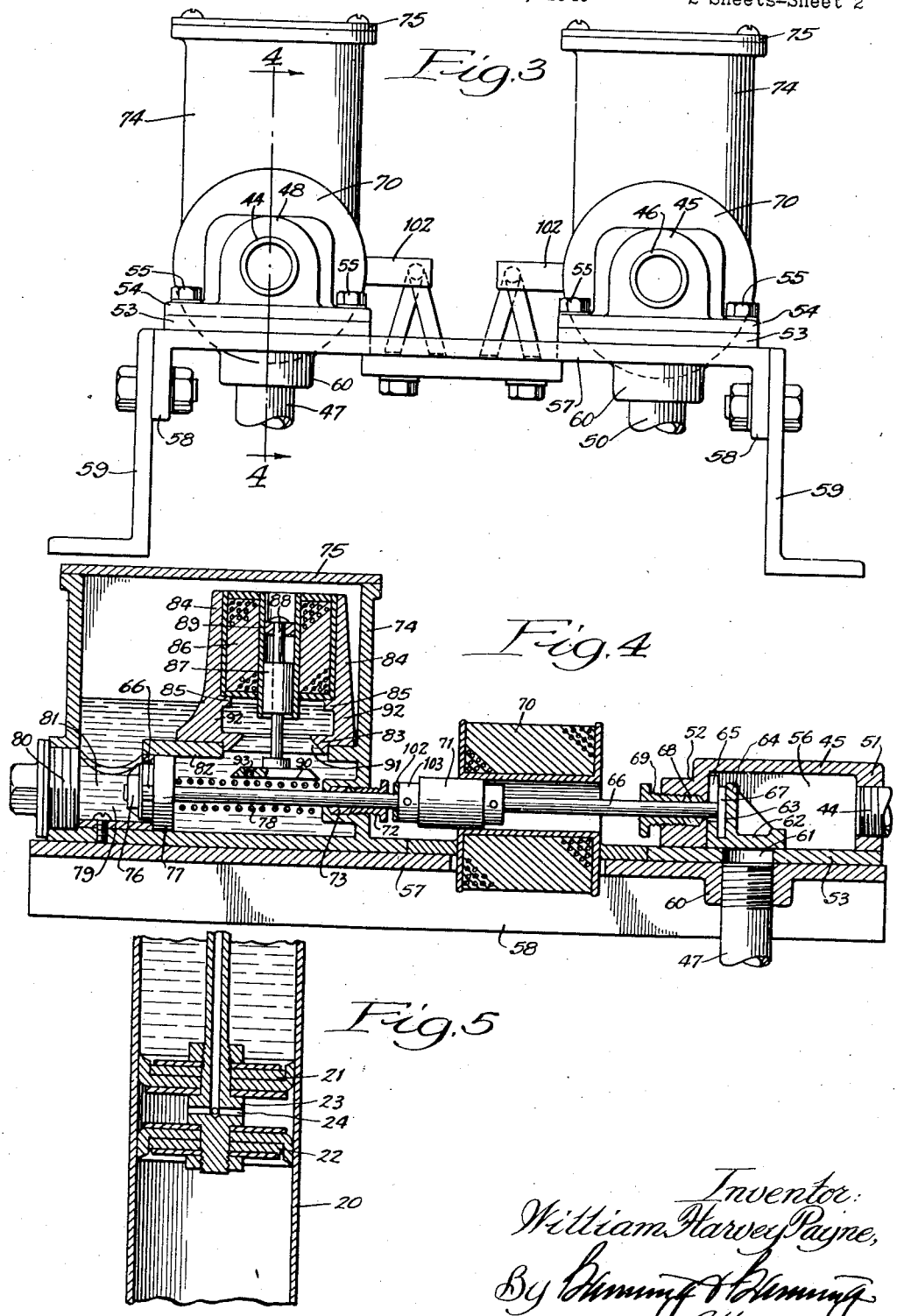

Patented Apr. 7, 1942

2,278,480

UNITED STATES PATENT OFFICE 2,278,480

MEANS FOR AUTOMATICALLY CONTROLLING THE ELECTRODES OF ARC FURNACES

William Harvey Payne, La Grange, Ill.

Application December 27, 1940, Serial No. 371,940

12 Claims. (Cl. 13—13)

This invention relates to an arc furnace wherein each of the electrodes is individually raised and lowered in conformity with the flow of electric current therethrough, in order insofar as possible, to maintain a spark gap of predetermined length with a corresponding uniformity in the current flow.

In the operation of an electric furnace employed for the melting down of scrap or like irregular bodies or lumps of metal, the material presents broken or irregular contact surfaces which constitute the poles for the electrodes and the form and elevation of these surfaces, and hence their distance from the electrodes is constantly changing as the material melts down into a liquid body. It is thus evident that provision must be made for instantaneously and rapidly regulating the positions of the respective electrodes in conformity with these changes in a mass of metal and in order that a uniform spark gap may be maintained between the electrode and the closest point in the mass of metal contiguous thereto and which for the time being constitutes the spark pole for the electrode.

At the beginning of the melting operation the cold scrap will present points or projections from which the arc is established, and as the melting proceeds the arc from each electrode will melt its hole or cavity through the scrap, and in these circumstances it is necessary for the electrode to follow the receding metal which normally melts down very rapidly. Molten metal from the holes through the scrap charge collects on the furnace bottom, so that within about fifteen percent (15%) of the total melting time the electrodes pass through the cold charge and arc to the pool of molten metal and slag thus formed on the furnace hearth, and from that time on to the completion of the melting of the scrap, this electric furnace heat is put in underneath the remainder of the charge which bridges over the cavity thus formed. Finally, this bridged over scrap falls in, and large sections of it may fall against one or more of the electrodes, thereby causing substantially short circuits and surging therefrom. These changes radically alter the arcing conditions within the furnace, so that quick adjusting movements of electrodes are necessary in order to maintain each electrode at the intended arcing distance, especially where the scrap falls in from above.

In the effort to maintain uniformity in the arcing distance for each electrode, difficulty has heretofore been experienced in devising control mechanism which shall be instantly responsive to changing conditions and which at the same time is so designed as to quickly and accurately move the associated electrode to the required degree to reestablish the intended arcing distance, without, however, overrunning the mark as a result of the inertia of the moving parts, and in an effort to overcome such difficulties, resort has been had to various means for damping the movements, which, however, have resulted in sluggishness of response or inaccuracy in the control of the required movements.

The present invention is designed to meet the requirements above set forth and overcome the difficulties noted, and to this end is particularly designed to include the following characteristics:

The invention in its preferred form employs a gaseous fluid, preferably a trapped body of air constantly under pressure sufficient not only to counterbalance the weight of the electrode and associated moving parts, but also to exert a positive lifting pressure which is utilized, as occasion requires, under the control of valve actuated fluid means which are capable of exerting sufficient pressure to overcome the excess lifting pressure of the gaseous fluid when it is desired to lower the electrode or to release the controlling pressure when it is desired to raise the electrode.

In particular, the invention is directed to the valve mechanism which is so designed as to instantly establish preliminary valve port registration when variations in the current flow require readjustment of the electrode, with a subsequent retarded or more gradual opening of the valve ports in order to impart an accelerated raising or lowering movement to the electrode. By instantly establishing port registration, the apparatus will very quickly respond to current variations and initiate an electrode adjusting movement, without, however, subjecting the moving parts to excessive strains by the application of the full force required in making the adjustment, which arrangement is highly desirable in apparatus of this character, in which a quick response rather than an extremely rapid adjustment is desirable.

The apparatus is also designed to effect the adjustments by the expenditure of a relatively small application of power, since gaseous fluid pressure affords a lifting medium of negligible inertia, and it is only necessary, in order to effect a lowering adjustment, to apply a sufficient counter-pressure to overcome the excess lifting pressure.

Other objects and details will appear from the description of the invention in conjunction with the accompanying drawings, wherein—

Figure 1 is a diagrammatic view illustrating the mechanism of the present invention and including a wiring diagram of the electrical circuits;

Fig. 2 is a top or plan view of the twin valve arrangement for admitting or withdrawing the liquid operating fluid;

Fig. 3 is an end view of the same;

Fig. 4 is a longitudinal sectional elevation through one of the valve assemblies; and Fig. 5 is a sectional elevation of the cylinder and piston for raising and lowering the electrode.

The mechanism of the present invention is employed in connection with an arc furnace 10 having electrodes 11 (preferably three in number) which extend vertically through the roof or cover 12 of the furnace. Each of the electrodes is carried at the end of an overhanging arm 13 and is supplied with current through a conductor cable 14 leading to and through the arm to the electrode.

It will be understood that each of the electrodes is equipped with the controlling mechanism of the present invention, so that it is deemed necessary to illustrate only one of the electrodes of the series.

The arm 13, as shown, is mounted upon a vertically movable carriage consisting of side rails 15 connected by a bridge bar 16, and mounted between rollers 17 which serve to guide the carriage and prevent the overhanging arm from sagging. The rollers are mounted upon a fixed frame 18 located adjacent to the side wall of the furnace.

The bridge bar 16 is supported upon a tubular piston rod 19 which extends downwardly into a cylinder 20 which is closed at its upper and lower ends. The piston rod at its lower end carries a double piston consisting of upper and lower sections 21 and 22 respectively. The piston sections are separated by a spacer collar 23 provided with apertures 24 leading to the interior of the tubular piston rod. This arrangement is one which affords an escape through the tubular piston rod for any air or oil which may leak past the pistons, so that such leakage will not result in a commingling of the fluids which are admitted respectively to the lower and upper portions of the cylinder.

Gaseous fluids (preferably air) for counterbalancing the weight of the electrode and the parts supporting the same, and for furnishing an excess lifting pressure, is admitted through a pipe 25 which enters the lower end of the cylinder and leads to a closed surge tank 26 within which the gaseous fluid is permanently trapped, so that a constant excess pressure is maintained save for possible leakage, with the result that when the air pressure is free to act effectively it will impart a lifting movement to the piston and parts supported thereby. At the same time the volume of the surge tank is sufficient to compensate for the slight variations in pressure occasioned by the movements of the piston, so that such variations are negligible in the operation of the device within the limits of its movement. At the same time the inertia of the gaseous fluid is negligible, so that in initiating the adjusting movements it is not necessary to overcome inertia such as might be occasioned by the employment of a counterweight or the like.

The current for supplying the electrode is preferably of low voltage and high amperage supplied from a transformer 27 in circuit with suitable line wires, and the current thus flowing to the electrode induces a current in a control circuit consisting of circuit wires 28 and 29, which circuit includes an adjusting rheostat 30 for regulating the current flow through a coil 31 which surrounds the armature 32 of an ammeter lever 33 which is fulcrumed at 34 and is held under opposition tension of a spring 35. By adjusting the rheostat 30 the current flow through the coil 31 can be regulated in this standard part of the circuit in any desired reasonable ratio to the strength of the current supplied to the electrode.

The free end of the ammeter lever 33 affords a switch which normally occupies an intermediate position between upper and lower contacts 36 and 37, and the tension of the spring can be adjusted to normally hold the ammeter lever in the intermediate position when the current flow through the electrode is normal and when no readjustment is required. If the current increases above normal, the armature 32 will be drawn down against the tension of the spring 35 and engagement will be made with the upper contact 36, and conversely if the current is reduced below normal, the spring 35 will act to bring the ammeter lever into engagement with the contact 37. The ammeter lever is in circuit with the line wire 38 through a branch connection 39, and the valve operating circuits presently to be described are energized through circuits which also include the line wire 40.

The liquid, preferably oil, which affords a pressure acting upon the upper side of the piston, is housed within a storage tank 41 into which leads a supply pipe 42 for a pump 43, which circulates oil under pressure through a pressure pipe 44 leading to a valve chamber 45. The pressure pipe 44 is supplied with a standard spring loaded shock absorber 44ª which is adapted to yield slightly from over pressure of oil inertia. The constantly operating hydraulic pump 43 has a standard spring loaded by-pass valve 44ᵇ so arranged that when the control is not moving, and all control oil is at rest, the pump oil is by-passed under pressure by the valve 44ᵇ back to the oil tank 41. Thus we have oil under pressure always available for operating the control as intended. The valve chamber 45, when the valve is open, supplies oil to a header pipe 46 through a branch pipe 47. The header pipe 46 leads to the top of the cylinder 20, and when oil under pressure is admitted through the valve chamber 45 under the thrust of the pump, it will exert a downward pressure on the piston sufficient in amount to overcome the excess air pressure acting upon the lower side of the piston, so that the electrode will be lowered.

The valve assembly also includes a valve casing 48 identical with the valve casing 45, and the valve casing 48 communicates with the header pipe 46 through a branch pipe 49. The valve casing also has entered thereto a return pipe 50 leading back to the storage tank 41, the arrangement being such that when the valve in the casing 45 is closed and the valve in the casing 48 is open, the excess air under the piston 22 will overcome the oil in the upper part of the cylinder 20 and the header pipe 46, the branch pipe 49, the valve casing 48, and the return pipe 50, so that the supply of oil in the cylinder will be depleted, allowing the air pressure below to elevate the electrode. The interior of the valve assembly is shown in Fig. 4, but since the assembly is in duplicate throughout, a description of one of the groups of mechanisms will suffice for both.

The valve casing 45 is of arched formation closed at its outer and inner ends 51 and 52 respectively. The pressure pipe 44 (or 49 as the case may be) leads into the outer end of the valve casing, which rests upon a bottom plate 53 and is provided with flanges 54 which receive bolts 55 which firmly unite the parts together to afford a sealed inner valve chamber 56. As shown, the valve assembly rests upon a platform 57 having side flanges 58 to which are secured legs or standards 59 for elevating the platform to the desired level, and in view of the fact that each assembly includes a pair of solenoids, it is desired to make the mountings of brass or other non-magnetic material.

The pipe 47 (or 50 as the case may be) is threaded into a boss 60 on the under side of the platform 57 and registers with a relatively large port 61 in the base plate 53, which port is controlled by a sliding valve shoe 62 which, when closed as in Fig. 4, overlaps the edges of the port in sufficient amount to firmly seal the port against the passage of oil. The pressure of the oil normally holds the valve shoe in sealing position against the inner end wall 52 of the casing. The valve shoe is provided with a recess 63 backed by an upstanding wall 64 on the outer side, and by a slotted wall 65 on the inner side. The slot in the wall 65 affords a clearance for the reception of the end of a valve stem 66 which carries a disk shaped head 67 at its end which is socketed within the recess 63 in the valve shoe. The valve stem extends through a packing 68 in the inner end wall of the casing which is compressed by a gland 69.

The valve stem is entered through a solenoid 70 and carries an armature 71 so disposed that when the solenoid is energized the armature will be drawn inwardly to the right which imparts a thrust to the valve shoe 62 of sufficient amplitude to fully open the valve port 61. The opposite end of the valve stem is entered through a gland 72 and packing 73 in the side wall of a box shaped dash pot chamber 74 which is closed at its top by a cap plate 75.

The end of the valve stem has fixedly mounted thereon a head 76 which normally stands in adjacent spaced relation to the slidably mounted piston 77 which receives the thrust of a coil spring 78 which holds the piston in contact with the rim wall of an inner collar 79 which is secured in contact with the end wall of the dash pot housing which at this point is closed by a screw plug 80. The collar 79 is cut away on its top side to afford an enlarged aperture 81 which affords free communication between the upper and lower portions of the housing.

The base of the housing is cast to afford an inner cylinder 82 which surrounds the piston 77, and the upper side of the cylinder wall is apertured to receive the base 83 of a frame 84 which is provided with arcuate ledges 85 which afford support for a solenoid 86 having an armature 87 mounted upon a valve stem 88 which is guided through a bridge block 89 spanning the interior of the solenoid. The lower end of the stem carries a beveled dampener disk valve 90 which when lifted engages and seals against a beveled seat 91. The solenoid frame 84 is formed to afford separated legs 92, so that free communication is maintained above the valve seat with the interior of the dash pot housing. The disk valve 90 is provided with a leak port 93 which may be adjusted to restrict the flow of oil through the valve when seated.

The arrangement is such that when both of the solenoids are simultaneously energized, the valve stem will be drawn to the right by the pull of the solenoid 70 while at the same time the valve 90 will be instantly closed. This movement has the effect of imparting a quick initial movement limited by the contact of the head 76 with the piston, which serves to shift the slide valve shoe 62 sufficiently to bring the inner edge of the slide valve into registry with the proximate edge of the port 61, thus eliminating the overlap and instantly adjusting the valve for its effective operation in progressively opening the port. The opening movement, however, will be retarded by reason of the fact that the oil which is trapped in the inner cylinder in front of the piston 77 can find escape only through the leak port 93, so that the pull of the solenoid 70 will thus effect a quick initiatory adjusting movement of the shoe valve in preparation for the effective opening which results in an accelerating movement of the electrode operating piston in the cylinder 22 as the port 61 is progressively opened.

Both solenoids 86 and both solenoids 70, as shown in the diagram, are located in booster circuits which include a header wire 94 from which lead circuit wires 95 and 96, each of which includes a solenoid 97 operating a switch 98. The booster circuits also include wires 99 and 100 leading to the respective solenoids 86, and return wires 101, each of which is interrupted by a switch 102. As shown, the line wire 38 is divided and connects directly with the solenoid 70.

The arrangement is such that when the contact 37 (or 36) is closed by the movement of the ammeter lever 33, a circuit will be established from the line wire 40 through the wire 94, switch 98, wire 99, solenoid 86, wire 101, the switch 102, solenoid 70, back to the line wire 38.

The switches 102 are provided to insure that when either of the valve operating circuits is closed, the other circuit will of necessity be open, so that the valves cannot be operated simultaneously. This result is attained by mounting each of the switch members 102 on a collar 103 carried by the valve stem 66. The switch includes contact points 104 and 105 so disposed that when each valve stem stands to the left, as illustrated in its normal or valve closing position, the contacts will be closed, but the arrangement is one in which each switch member controls the companion valve operating assembly, so that as soon as one of the valve stems is drawn inwardly by the closing of its booster circuit, the booster circuit for the companion valve assembly will be opened, and the valve in that circuit will of necessity remain in its normal or closed position.

Operation

When the current flow to the electrode is normal, the ammeter lever 33 will stand in the intermediate or neutral position between the contacts 36 and 37, but if the current flow suddenly increases, due to the falling in of scrap material against the electrode, or from other causes, so that it becomes necessary to raise the electrode, the increase in current will induce an increased current through the solenoid which controls the ammeter lever 33, thus instantly lifting the lever against the tension of the spring 35 into engagement with the contact 36, which will close the circuit, including the associated switch 98, which thus closes the circuit through the upper valve control assembly, thereby simultaneously energizing the solenoids 86 and 70 in that assembly.

This will result in a snap closing of the dampener valve 90 and an instant initiatory movement of the valve stem 66 until the head 76 engages the piston 77. This initiatory movement eliminates the overlap of the sliding shoe valve 62 in preparation for the effective opening of the port 61. Thereafter, the progressive opening movement of the valve will be retarded by the trapping of the oil within the cylinder 82, but as the valve opening through the port 61 enlarges, the oil flow from the top of the cylinder 20 will progressively increase in volume, which permits the excess air pressure below the piston in the cylinder 22 to act with increasing speed of the lifting of the electrode. As the electrode rises, the excess current flow through the electrode will be reduced until stable conditions are again attained, at which time the undamped ammeter lever will again resume its neutral position. When this occurs, solenoids 86 and 70 are deenergized and the damper valve 90 drops, and line oil pressure instantly pushes the slide valve 62 closed. Thus a valve cycle is completed, that of quick valve overlap travel, and adjustably damped port opening, and finally, snap closure of the valve, the instant that proper current is attained, to prevent over travel of the electrode being controlled.

The electrode will then stand stationary until further vertical adjustment is required in either direction. To lower the electrode, a corresponding series of operations will occur, but in this event the valve which controls the inflow of oil under the thrust of the oil pump will be opened so that additional oil will be driven into the upper end of the cylinder 20, thereby building up the oil pressure in sufficient degree to overcome the excess air pressure so that a lowering of the electrode will occur by a controlled sequence of valve movements as described above.

The oil pump is constantly driven to maintain useful oil pressure in pipes at all times. Under normal conditions, when both oil valves are closed, sufficient oil will be trapped in the upper portion of the cylinder to prevent the excess pressure of the air from lifting the electrode, but when occasion requires, the opening of one valve or the other will permit the flow of oil under power in the required direction either to act against the air pressure or concurrently with it in effecting a movement of the electrode in the required direction. It is not necessary, therefore, to generate an excessive oil pressure, since all that is required is a sufficient excess over the air pressure to overcome the latter when it becomes necessary to lower the electrode.

This invention employs in combination a light weight slow moving, low inertia, hydraulic prime mover, with a valve movement having three distinct sequential stages in completing a cycle for a unidirectional electrode movement.

a. Quick valve port overlap travel in initiating a movement.

b. Adjustably damped valve port opening to give electrode speed control, slow first movements for short travel, and higher speeds with complete port registrations for long haul outs as the occasion requires.

c. Instant non-damped snap closure of a valve, when an adjustment is completed, to prevent over travel and arc breaking.

Immediate response of an electrode prime mover is of more importance than rapid adjustment of the electrode in preventing carbon pickup in making stainless steels, and in preventing surging, or arc breaking.

In the present embodiment of the invention as disclosed above, with the electrode movements governed by the sequentially operative valves, the lowering movement is occasioned by adding the necessary oil pressure to the electrode and arm weight to push the air counterbalanced electrode arm down. It will be understood, however, that these controlled sequential valve movements can be applied also to a non-counterbalanced electrode movement, with improvement in the art, although not as effectively as if the arm weight is counter-balanced mechanically or by low inertia air as described.

It is further understood that although current changes alone have been described as the directing values for controlling these electrode movements, the electrodes may also be responsive to combination current and voltage changes, or voltage changes alone, without detracting from the purposes of this invention, all of which changes are embraced in the expression "variations in current flow" as employed in the claims.

I claim:

1. In apparatus of the class described, an electric arc melting furnace having an arcing electrode, a movable arm adapted to carry the electrode and supply current thereto, means for applying a lifting pressure to said arm in excess of the weight of the arm and the electrode carried thereby for lifting the arm and electrode, means for applying a lowering pressure to said arm in excess of the effective lifting pressure for overcoming the same to lower the arm and electrode, a valve assembly for admitting a liquid pressure medium to said lowering pressure means to effect a lowering of the electrode, and a second valve assembly for releasing said liquid pressure medium therefrom to permit lifting of the electrode, each valve assembly including a ported valve casing and a valve member normally overlapping the margins of the valve port to seal the same, and controlling devices for said respective valves including means responsive to variations in current flow through the electrode for operating one or the other of said valves and adapted initially to impart an approximately instantaneous overlap travel to the proper valve to quickly establish port registration and thereafter adapted to impart a retarded movement of the valve in progressively opening the port to admit or release liquid pressure as the case may be and adapted to snap closed instantly when normal arcing conditions are reestablished.

2. In apparatus of the class described, an electric arc melting furnace having an arcing electrode, a movable arm adapted to carry the electrode and supply current thereto, means for applying a lifting pressure to said arm in excess of the weight of the arm and the electrode carried thereby for lifting the arm and electrode, means for applying a lowering pressure to said arm in excess of the effective lifting pressure for overcoming the same to lower the arm and electrode, a valve assembly for admitting a liquid pressure medium to said lowering pressure means to effect a lowering of the electrode, and a second valve assembly for releasing said liquid pressure medium therefrom to permit lifting of the electrode, each valve assembly including a ported valve casing and a valve member normally overlapping the margins of the valve port to seal the same, and controlling devices for said respective valves including means responsive to variations in current flow through the electrode for operating one or the other of said valves and adapted initially to impart an approximately instantaneous overlap travel to the proper valve to quickly establish port registration and thereafter adapted to impart a retarded movement to the valve in progressively opening the port to admit or release liquid pressure as the case may be, and means actuated by the movement of one of the valves for preventing concurrent operation of the other valve.

3. In apparatus of the class described, an electric arc melting furnace having an arcing electrode, a movable arm adapted to carry the electrode and supply current thereto, means for applying a lifting pressure to said arm in excess of the weight of the arm and the electrode carried thereby for lifting the arm and electrode, means for applying a lowering pressure to said arm in excess of the effective lifting pressure for overcoming the same to lower the arm and electrode, a valve assembly for admitting a liquid pressure medium to said lowering pressure means to effect a lowering of the electrode, and a second valve assembly for releasing said liquid pressure medium therefrom to permit lifting of the electrode, each valve assembly including a ported valve casing and a valve member normally overlapping the margins of the valve port to seal the same, and controlling devices for said respective valves including means responsive to variations in current flow through the electrode, and solenoids connected with the respective valves and in circuits adapted to be energized by the operation of said respective means for operating one or the other of said valves and adapted initially to impart an approximately instantaneous overlap travel to the proper valve to quickly establish port registration and thereafter to impart a retarded movement of the valve in progressively opening the port to admit or retract liquid pressure as the case may be and adapted to snap close instantly when normal arcing conditions are reestablished.

4. In apparatus of the class described, an electric arc melting furnace having an arcing electrode, a movable arm adapted to carry the electrode and supply current thereto, means for applying a lifting pressure to said arm in excess of the weight of the arm and the electrode carried thereby for lifting the arm and electrode, means for applying a lowering pressure to said arm in excess of the effective lifting pressure for overcoming the same to lower the arm and electrode, a valve assembly for admitting a liquid pressure medium to said lowering pressure means to effect a lowering of the electrode, and a second valve assembly for releasing said liquid pressure medium therefrom to permit lifting of the electrode, each valve assembly including a ported valve casing and a valve member normally overlapping the margins of the valve port to seal the same, and controlling devices for said respective valves including means responsive to variations in current flow through the electrode, and solenoids connected with the respective valves and in circuits adapted to be energized by the operation of said respective means for operating one or the other of said valves and adapted initially to impart an approximately instantaneous overlap travel to the proper valve to quickly establish port registration and thereafter to impart a retarded movement of the valve in progressively opening the port to admit or release liquid pressure as the case may be, said means being snap closed when the adjustment has ended, and means actuated by the movement of one of the valves for preventing concurrent operation of the other valve.

5. In apparatus of the class described, an electric arc melting furnace having an arcing electrode, a movable arm adapted to carry the electrode and supply current thereto, means for applying a lifting pressure to said arm in excess of the weight of the arm and the electrode carried thereby for lifting the arm and electrode, means for applying a lowering pressure in excess of the effective lifting pressure for overcoming the same to lower the arm and electrode, a valve assembly for admitting a liquid pressure medium to said lowering pressure means to effect a lowering of the electrode, and a second valve assembly for releasing said liquid pressure medium therefrom to permit lifting of the electrode, each valve assembly including a ported valve casing and a valve member normally overlapping the margins of the valve port to seal the same, and controlling devices for said respective valves including means responsive to variations in current flow through the electrode for operating one or the other of said valves and adapted initially to impart an approximately instantaneous overlap travel to the proper valve to quickly establish port registration and thereafter adapted to impart a retarded movement of the valve in progressively opening the port to admit or release liquid pressure as the case may be, the retarding means being in the form of a dash pot assembly cooperating with each valve, each dash pot assembly including devices operable concurrently with the initial movement of the associated valve for establishing retarding conditions.

6. In apparatus of the class described, an electric arc melting furnace having an arcing electrode, a movable arm adapted to carry the electrode and supply current thereto, means for applying a lifting pressure to said arm in excess of the weight of the arm and the electrode carried thereby for lifting the arm and electrode, means for applying a lowering pressure in excess of the effective lifting pressure for overcoming the same to lower the arm and electrode, a valve assembly for admitting a liquid pressure medium to said lowering pressure means to effect a lowering of the electrode, and a second valve assembly for releasing said liquid pressure medium therefrom to permit lifting of the electrode, each valve assembly including a ported valve casing and a valve member normally overlapping the margins of the valve port to seal the same, and controlling devices for said respective valves including means responsive to variations in current flow through the electrode for operating one or the other of said valves and adapted initially to impart an approximately instantaneous overlap travel to the proper valve to quickly establish port registration and thereafter adapted to impart a retarded movement to the valve in progressively opening the port to admit or release liquid pressure as the case may be, and means actuated by the movement of one of the valves for preventing concurrent operation of the other valve, the retarding means being in the form of a dash pot assembly cooperating with each valve, each dash pot assembly including devices operable concurrently with the initial movement of the associated valve for establishing retarding conditions.

7. In apparatus of the class described, an electric arc melting furnace having an arcing electrode, a movable arm adapted to carry the electrode and supply current thereto, means for applying a lifting pressure to said arm in excess of the weight of the arm and the electrode carried thereby for lifting the arm and electrode, means for applying a lowering pressure in excess of the effective lifting pressure for overcoming the same to lower the arm and electrode, a valve assembly for admitting a liquid pressure medium to said lowering pressure means to effect a lowering of the electrode, and a second valve assembly for releasing said liquid pressure medium therefrom to permit lifting of the electrode, each valve assembly including a ported valve casing and a valve member normally overlapping the margins of the valve port to seal the same, and controlling devices for said respective valves including means responsive to variations in current flow through the electrode, and solenoids connected with the respective valves and in circuits adapted to be energized by the operation of the controlling devices for operating one or the other of said valves and adapted initially to impart an approximately instantaneous overlap travel to the proper valve to quickly establish port registration and thereafter to impart a retarded movement of the valve in progressively opening the port to admit or release liquid pressure as the case may be, the retarding means being in the form of a dash pot assembly cooperating with each valve, each dash pot assembly including devices operable concurrently with the initial movement of the associated valve for establishing retarding conditions.

8. In apparatus of the class described, an electric arc melting furnace having an arcing electrode, a movable arm adapted to carry the electrode and supply current thereto, means for applying a lifting pressure to said arm in excess of the weight of the arm and the electrode carried thereby for lifting the arm and electrode, means for applying a lowering pressure in excess of the effective lifting pressure for overcoming the same to lower the arm and electrode, a valve assembly for admitting a liquid pressure medium to said lowering pressure means to effect a lowering of the electrode, and a second valve assembly for releasing said liquid pressure medium therefrom to permit lifting of the electrode, each valve assembly including a ported valve casing and a valve member normally overlapping the margins of the valve port to seal the same, and controlling devices for said respective valves including means responsive to variations in current flow through the electrode, and solenoids connected with the respective valves and in circuits adapted to be energized by the operation of the controlling devices for operating one or the other of said valves and adapted initially to impart an approximately instantaneous overlap travel to the proper valve to quickly establish port registration and thereafter to impart a retarded movement to the valve in progressively opening the port to admit or release liquid pressure as the case may be, and means actuated by the movement of one of the valves for preventing concurrent operation of the other valve, the retarding means being in the form of a dash pot assembly cooperating with each valve, each dash pot assembly including devices operable concurrently with the initial movement of the associated valve for establishing retarding conditions.

9. In apparatus of the class described, an electric arc melting furnace having an arcing electrode, a movable arm adapted to carry the electrode and supply current thereto, means for applying a fluid pressure to said arm in excess of the weight of the arm and the electrode carried thereby for lifting the arm and electrode, means for applying a lowering pressure in excess of the effective fluid pressure for overcoming the same to lower the arm and electrode, a valve assembly for admitting a liquid pressure medium to said lowering pressure means to effect a lowering of the electrode, and a second valve assembly for releasing said liquid pressure medium therefrom to permit lifting of the electrode, each valve assembly including a ported valve casing and a slide valve adapted normally to overlap the port to seal the same and adapted when actuated to first eliminate valve overlap and thereafter to progressively open said port, each valve having a valve stem terminating in a head and having a piston slidably mounted on the stem in advance of the head, each head and piston being slidably mounted within a dash pot cylinder provided with an outlet and a valve controlling said outlet and provided with a leak port, the head of the valve stem adapted to have a limited initial movement to bring the head into contact with the associated piston and the piston closely fitting within the dash pot cylinder, and controlling means for each valve assembly including means responsive to variations in current flow through the electrode for first imparting an approximately instantaneous movement to the valve stem head to bring the same into contact with the associated piston and for concurrently closing the dash pot valve to trap a quantity of liquid within the dash pot cylinder to retard the continued movement of the valve stem during the progressive movement of the valve in opening the associated port for supplying or releasing the liquid pressure medium as the case may be.

10. In apparatus of the class described, an electric arc melting furnace having an arcing electrode, a movable arm adapted to carry the electrode and supply current thereto, means for applying a fluid pressure to said arm in excess of the weight of the arm and the electrode carried thereby for lifting the arm and electrode, means for applying a lowering pressure in excess of the effective fluid pressure for overcoming the same to lower the arm and electrode, a valve assembly for admitting a liquid pressure medium to said lowering pressure means to effect a lowering of the electrode, and a second valve assembly for releasing said liquid pressure medium therefrom to permit lifting of the electrode, each valve assembly including a ported valve casing and a slide valve adapted normally to overlap the port to seal the same and adapted when actuated to first eliminate valve overlap and thereafter to progressively open said port, each valve having a valve stem terminating in a head and having a piston slidably mounted on the stem in advance of the head, each head and piston being slidably mounted within a dash pot cylinder provided with an outlet and a valve controlling said outlet and provided with a leak port, the head of the valve stem adapted to have a limited initial movement to bring the head into contact with the associated piston and the piston closely fitting within the dash pot cylinder, and controlling means for each valve assembly including means responsive to variations in current flow through the electrode, a solenoid connected with each associated valve stem and a solenoid connected with each associated dash pot valve, and electrical connections for simultaneously energizing both solenoids of the same valve assembly to impart a quick initiatory overlap travel to the valve stem to establish port registration and a retarded movement thereafter.

11. In an electric arc melting furnace, an arcing electrode and a movable arm carrying the electrode and the heating current connection to the electrode, means for exerting a lifting effect on the arm and electrode in excess of the weight thereof, means for guiding the arm for vertical movement, liquid-pressure-actuated means engaging the arm, arc-variation-actuated means for controlling the flow of liquid pressure to and from said liquid-pressure-actuated means either actively in opposition to and in excess of the lifting effect to lower the arm and electrode or by allowing escape of said liquid to permit raising of the electrode, said liquid controlling means including a pair of non-concurrently operable sequentially operated valve members for respectively regulating the flow of liquid in opposite directions, each valve member being adapted to give instant valve port overlap travel followed by retarded progressive valve opening and thereafter by instantaneous snap closure of the valve as soon as the electrode movement has restored the desired arcing conditions.

12. In an electric arc melting furnace, an arcing electrode and a movable arm carrying the electrode and the heating current connection to the electrode, and means for guiding the arm for vertical movement, liquid - pressure - actuated means engaging the arm, arc-variation-actuated means for controlling the flow of liquid pressure to said liquid-pressure-actuated means, said flow in one direction acting to effect a movement of the arm and electrode in a corresponding direction and like means for controlling the flow in the opposite direction for effecting movement of the arm and electrode in the correspondingly opposite direction, said means in the two cases including non-concurrently operable sequentially operated valve members adapted each to give instant valve port overlap travel followed by retarded progressive valve opening and thereafter by instantaneous snap closure of the valves as soon as the electrode movement has restored the desired arcing conditions.

WILLIAM HARVEY PAYNE.